United States Patent
Wu et al.

(10) Patent No.: US 11,631,240 B2
(45) Date of Patent: Apr. 18, 2023

(54) METHOD, APPARATUS AND SYSTEM FOR IDENTIFYING TARGET OBJECTS

(71) Applicant: SENSETIME INTERNATIONAL PTE. LTD., Singapore (SG)

(72) Inventors: Jin Wu, Singapore (SG); Kaige Chen, Singapore (SG); Shuai Yi, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 318 days.

(21) Appl. No.: 17/127,200

(22) Filed: Dec. 18, 2020

(65) Prior Publication Data
US 2022/0036067 A1    Feb. 3, 2022

Related U.S. Application Data

(63) Continuation of application No. PCT/IB2020/060203, filed on Oct. 30, 2020.

(30) Foreign Application Priority Data

Aug. 1, 2020 (SG) ............................ 10202007347V (51) Int. Cl.
*G06V 20/00* (2022.01)
*G06T 7/11* (2017.01)
(Continued)

(52) U.S. Cl.
CPC ........... *G06V 20/00* (2022.01); *G06K 9/6232* (2013.01); *G06K 9/6256* (2013.01); *G06N 3/04* (2013.01);
(Continued)

(58) Field of Classification Search
None
See application file for complete search history.

(56) References Cited

U.S. PATENT DOCUMENTS

| | | |
|---|---|---|
| 2003/0220136 A1 | 11/2003 | Soltys et al. |
| 2005/0051965 A1 | 3/2005 | Gururajan |

(Continued)

FOREIGN PATENT DOCUMENTS

| | | |
|---|---|---|
| CN | 108228703 A | 6/2018 |
| CN | 109344832 A | 2/2019 |

(Continued)

OTHER PUBLICATIONS

Written Opinion Issued in Singapore Application No. 10202007347V, dated Jan. 8, 2021, 7 pages.

(Continued)

*Primary Examiner* — Leon Flores (57) ABSTRACT

The present disclosure provides a method, apparatus and system for identifying target objects. The method includes: clipping out a target image from an acquired image, wherein the target image involves a plurality of target objects to be identified that are stacked; adjusting a height of the target image to a preset height, wherein a height direction of the target image corresponds to a direction in which the plurality of target objects are stacked; extracting a feature map of the adjusted target image; segmenting the feature map in a dimension corresponding to the height direction of the target image to obtain a preset number of segment features; and identifying the target objects based on each of the preset number of segment features.

20 Claims, 3 Drawing Sheets

(51) Int. Cl.
*G06T 7/73* (2017.01)
*G06V 10/40* (2022.01)
*G06K 9/62* (2022.01)
*G06N 3/04* (2023.01)
*G06N 3/08* (2023.01)
*G06T 3/40* (2006.01)

(52) U.S. Cl.
CPC ............... *G06N 3/08* (2013.01); *G06T 3/40* (2013.01); *G06T 7/11* (2017.01); *G06T 7/73* (2017.01); *G06V 10/40* (2022.01); *G06T 2207/20081* (2013.01); *G06T 2207/20084* (2013.01); *G06T 2207/20132* (2013.01)

(56) References Cited

U.S. PATENT DOCUMENTS

2011/0052049 A1* 3/2011 Rajaraman ......... G06K 9/00496
382/165
2016/0358337 A1 12/2016 Dai et al.
2020/0302168 A1* 9/2020 Vo ..................... H04N 7/183

FOREIGN PATENT DOCUMENTS

| | | |
|---|---|---|
| CN | 111062237 A | 4/2020 |
| CN | 111310751 A | 6/2020 |
| JP | 2009245226 A | 10/2009 |
| WO | 2019/068141 A1 | 4/2019 |

OTHER PUBLICATIONS

International Search Report and Written Opinion Issued in PCT Application No. PCT/IB2020/060203, dated Mar. 2, 2021, 9 pages.
Search Report and Written Opinion for Singapore Application No. 10202007347V, dated Oct. 1, 2020, 8 pages.
Japanese Patent Office, Office Action Issued in Application No. 2021-523386, dated Nov. 15, 2022, 6 pages.

* cited by examiner

METHOD, APPARATUS AND SYSTEM FOR IDENTIFYING TARGET OBJECTS

CROSS-REFERENCE TO RELATED APPLICATIONS

This application is a continuation application of International Patent Application No. PCT/IB2020/060203, filed on Oct. 30, 2020, which is based on and claims a priority to and benefit of the Singaporean patent application No. 10202007347V filed on Aug. 1, 2020. The content of all of the above-identified applications is incorporated herein by reference in their entirety.

TECHNICAL FIELD

The present disclosure relates to the field of computer vision technology, and in particular, to a method, apparatus and system for identifying target objects.

BACKGROUND

In daily production and life, it is often necessary to identify some target objects. Taking an entertainment scene of board games as an example, in some board games, game coins on a tabletop need to be identified so as to obtain the category and number information of the game coins. However, conventional identification methods are low in identification accuracy.

SUMMARY

According to an aspect of the present disclosure, provided is a method for identifying target objects, including: clipping out a target image from an acquired image, wherein the target image involves a plurality of target objects to be identified that are stacked; adjusting a height of the target image to a preset height, wherein a height direction of the target image corresponds to a direction in which the plurality of target objects to be identified are stacked; extracting a feature map of the adjusted target image; segmenting the feature map in a dimension corresponding to the height direction of the target image to obtain a preset number of segment features; and identifying the target objects based on each of the preset number of segment features.

In combination with any of implementations provided by the present disclosure, adjusting the height of the target image to the preset height includes: scaling the height and a width of the target image in equal proportions until a width of the scaled target image reaches a preset width; and in a case that a height of the scaled target image is greater than the preset height, reducing the height and width of the scaled target image by equal proportions until a height of the reduced target image is equal to the preset height.

In combination with any of the implementations provided by the present disclosure, adjusting the height of the target image to the preset height includes: scaling the height and a width of the target image in equal proportions until a width of the scaled target image reaches a preset width; and in a case that a height of the scaled target image is less than the preset height, filling the scaled target image with first pixels, so that a height of the filled target image is equal to the preset height.

In combination with any of the implementations provided by the present disclosure, each of the target objects to be identified in the target image is sheet-like and has an equal thickness, and the plurality of target objects to be identified are stacked in a direction of the thickness; and the preset height is an integer multiple of the thickness.

In combination with any of the implementations provided by the present disclosure, extracting the feature map and identifying the target objects both are performed by a neural network which is trained from a sample image and labeled information thereof.

In combination with any of the implementations provided by the present disclosure, the labeled information of the sample image comprises a labeled category of each target object in the sample image; and the neural network is trained by: extracting features from a resized sample image to obtain a feature map of the resized sample image; identifying target objects in the sample image based on each segment feature that is obtained by segmenting the feature map, to obtain a predicted category of each of the target objects in the sample image; and adjusting a value of a parameter for the neural network based on the predicted category of each target object in the sample image and the labeled category of each target object in the sample image.

In combination with any of the implementations provided by the present disclosure, the labeled information of the sample image further comprises a number of target objects of each labeled category; and adjusting the value of the parameter for the neural network comprises: adjusting the value of the parameter for the neural network based on the predicted category of each target object in the sample image, the labeled category of each target object in the sample image, the number of target objects of each labeled category in the sample image, and a number of target objects of each predicted category in the sample image.

In combination with any of the implementations provided by the present disclosure, the labeled information of the sample image further comprises a total number of target objects in the sample image; and adjusting the value of the parameter for the neural network comprises: adjusting the value of the parameter for the neural network based on the predicted category of each target object in the sample image, the labeled category of each target object in the sample image, a sum of numbers of target objects of respective predicted category in the sample image, and the total number of target objects in the sample image.

In combination with any of the implementations provided by the present disclosure, the method further includes: testing the trained neural network; ranking an identification accuracy for each category of target objects identified by the neural network based on a result of the testing, to obtain an identification accuracy rank result; ranking an identification error rate for each category of target objects identified by the neural network based on the result of the testing, to obtain an identification error rate rank result; and further training the neural network based on the identification accuracy rank result and the identification error rate rank result.

According to an aspect of the present disclosure, provided is an apparatus for identifying target objects, including: an obtaining unit, configured to clip out a target image from an acquired image, wherein the target image involves a plurality of target objects to be identified that are stacked; an adjusting unit, configured to adjust a height of the target image to a preset height, wherein a height direction of the target image corresponds to a direction in which the plurality of target objects to be identified are stacked; an extracting unit, configured to extract a feature map of the adjusted target image; a segmenting unit, configured to segment the feature map in a dimension corresponding to the height direction of the target image to obtain a preset number of segment features; and an identifying unit, configured to identify the target objects based on each of the preset number of segment features.

In combination with any of the implementations provided by the present disclosure, the adjusting unit is configured to: scale the height and a width of the target image in equal proportions until a width of the scaled target image reaches a preset width; and in a case that a height of the scaled target image is greater than the preset height, reduce the height and width of the scaled target image by equal proportions until a height of the reduced target image is equal to the preset height.

In combination with any of the implementations provided by the present disclosure, the adjusting unit is configured to: scale the height and a width of the target image in equal proportions until a width of the scaled target image reaches a preset width; and in a case that a height of the scaled target image is less than the preset height, fill the scaled target image with first pixels, so that a height of the filled target image is equal to the preset height.

In combination with any of the implementations provided by the present disclosure, each of the target objects to be identified in the target image is sheet-like and has an equal thickness, and the plurality of target objects to be identified are stacked in a direction of the thickness; and the preset height is an integer multiple of the thickness.

In combination with any of the implementations provided by the present disclosure, extracting the feature map and identifying the target objects both are performed by a neural network which is trained from a sample image and labeled information thereof.

In combination with any of the implementations provided by the present disclosure, the labeled information of the sample image comprises a labeled category of each target object in the sample image; and the apparatus further comprises a training unit configured to train the neural network by: extracting feature from a resized sample image to obtain a feature map of the resized sample image; identifying target objects in the sample image based on each segment feature that is obtained by segmenting the feature map, to obtain a predicted category of each of the target objects in the sample image; and adjusting a value of a parameter for the neural network based on the predicted category of each target object in the sample image and the labeled category of each target object in the sample image.

In combination with any of the implementations provided by the present disclosure, the labeled information of the sample image further comprises a number of target objects of each labeled category; and the training unit is configured to: adjust the value of the parameter for the neural network based on the predicted category of each target object in the sample image, the labeled category of each target object in the sample image, the number of target objects of each labeled category in the sample image, and a number of target objects of each predicted category in the sample image.

In combination with any of the implementations provided by the present disclosure, the labeled information of the sample image further comprises a total number of target objects in the sample image; and the training unit is specifically configured to: adjust the value of the parameter for the neural network based on the predicted category of each target object in the sample image, the labeled category of each target object in the sample image, a sum of numbers of target objects of respective predicted category in the sample image, and the total number of target objects in the sample image.

In combination with any of the implementations provided by the present disclosure, the apparatus further includes a testing unit, configured to: test the trained neural network; rank an identification accuracy for each category of target objects identified by the neural network based on a result of the testing, to obtain an identification accuracy rank result; rank, an identification error rate for each category of target objects identified by the neural network based on the result of the testing, to obtain an identification error rate rank result; and further training the neural network based on the identification accuracy rank result and the identification error rate rank result.

According to an aspect of the present disclosure, provided is an electronic device, including a processor; and a memory storing computer readable instructions executable by the processor; wherein the processor is configured to execute the computer readable instructions to implement the method according to any of the implementations of the present disclosure.

According to an aspect of the present disclosure, provided is a computer readable storage medium having computer program instructions stored thereon, when executed by a processor, cause the processor to implement the method according to any of the implementations of the present disclosure.

According to the method and apparatus for identifying target objects, and the electronic device and the storage medium provided by one or more embodiments of the present disclosure by adjusting the height of the target image clipped out from the acquired image to the preset height, extracting a feature map of the adjusted target image; and segmenting the feature map in the dimension corresponding to the height direction of the target image to obtain a preset number of segment features, the target objects are identified based on each of the preset number of segment features. Because the segment feature obtained by segmenting corresponds to the feature map of each target object, the number of target objects does not affect the identification accuracy of identifying the target objects based on the segment features, thereby improving the identification accuracy for the target objects.

It should be understood that the above general description and the following detailed description are merely exemplary and explanatory, and are not intended to limit the present disclosure.

BRIEF DESCRIPTION OF THE DRAWINGS

The accompanying drawings herein, which are incorporated in and constitute a part of the specification, illustrate embodiments of the present disclosure and are used to explain technical solutions of the present disclosure together with the specification.

DETAILED DESCRIPTION OF THE EMBODIMENTS

To make persons skilled in the art better understand the present disclosure, some embodiments thereof will be clearly and completely described below with reference to the accompanying drawings. It is apparent that the described embodiments are only part of possible embodiments of the present disclosure. All other embodiments, which may be obtained by a person of ordinary skill in the art based on one or more embodiments of the present disclosure without any inventive effort, fall within the scope of the present disclosure.

The terms used in the present disclosure are for the purpose of describing particular embodiments only and are not intended to limit present disclosure. The singular forms "a/an", "said", and "the" used in the present disclosure and the appended claims are also intended to include the plural forms, unless the context clearly indicates other meanings. It should also be understood that the term "and/or" used herein refers to and includes any or all possible combinations of one or more associated listed items. In addition, the term "at least one" herein indicates any one of a plurality or any combination of at least two of the plurality.

It should be understood that although the terms such as first, second, and third may be used in the present disclosure to describe various information, the information should not be limited by these terms. These terms are only used to distinguish the same type of information from one another. For example, in the case of not departing from the scope of the present disclosure, first information may also be referred to as second information, and similarly, the second information may also be referred to as the first information. Depending on the context, the word "if" as used herein may be interpreted as "at the time of . . . " or "when . . . " or "in response to determining".

Figure 1:
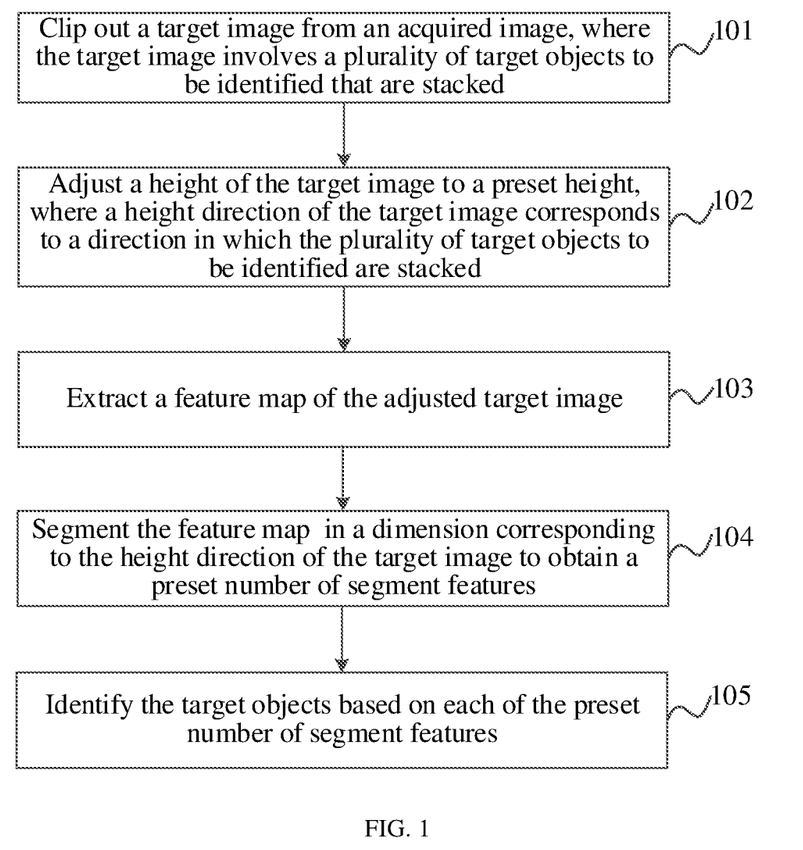
FIG. 1 is a flowchart of a method for identifying target objects according to at least one embodiment of the present disclosure.

FIG. 1 is a flowchart of a method for identifying target objects according to at least one embodiment of the present disclosure. As shown in FIG. 1, the method may include steps 101-105.

At step 101, a target image is clipped out from an acquired image, wherein the target image involves a plurality of target objects to be identified that are stacked.

Figure 2A:
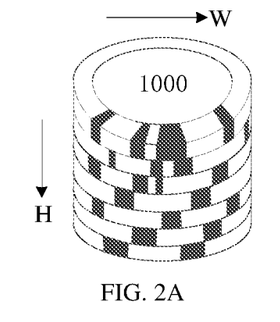
FIG. 2A is a schematic diagram of a plurality of target objects which are stacked in a stand mode in the method for identifying target objects according to at least one embodiment of the present disclosure.
Figure 2B:
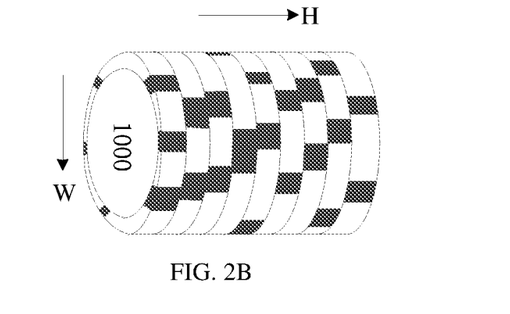
FIG. 2B is a schematic diagram of a plurality of target objects which are stacked in a float mode in the method for identifying target objects according to at least one embodiment of the present disclosure.

In some common situations, each of the target objects to be identified is sheet-like in various shapes, for example, game coins, and the thickness (height) of each target object is usually the same. The plurality of the target objects to be identified are usually stacked in a direction of the thickness. As shown in FIG. 2A, a plurality of game coins are stacked in a vertical direction (stacked in a stand mode), the height direction (H) of the target image is the vertical direction, and the width direction (W) of the target image is a direction perpendicular to the height direction (H) of the target image. And as shown in FIG. 2B, the plurality of game coins are stacked in a horizontal direction (stacked in a float mode), the height direction (H) of the target image is the horizontal direction, and the width direction (W) of the target image is a direction perpendicular to the height direction (H) of the target image.

The target objects to be identified may be target objects placed in a target region. The target region may be a plane (for example, a tabletop), a container (for example, a box), and the like. An image of the target region may be acquired by an image acquisition apparatus near the target region, such as a camera or a webcam.

In the embodiments of the present disclosure, a deep learning network, such as an RCNN (Regions Convolutional Neural Networks), may be used to detect the acquired image to obtain a detection result of target objects, and the detection result may be a bounding box. Based on the bounding box, the target image, which involves the plurality of target objects to be identified that are stacked, may be clipped out from the acquired image. It should be understood by a person skilled in the art that the RCNN is an example only, and other deep learning networks may also be used for target detection, which is not limited in the present disclosure.

At step 102, a height of the target image is adjusted to a preset height.

A height direction of the target image corresponds to a direction in which the plurality of target objects to be identified are stacked, and the preset height may be an integer multiple of the thickness. Taking the stacked game coins shown in FIGS. 2A and 2B as an example, the direction of stacking the game coins displayed in FIGS. 2A and 2B may be determined to be the height direction of the target image, and accordingly, the radial direction of the game coins is determined to be the width direction of the target image.

At step 103, a feature map of the adjusted target image is extracted.

For the adjusted target image, a pre-trained feature extraction network may be used so as to obtain the feature map of the adjusted target image, wherein the feature extraction network may include a plurality of convolutional layers, or include a plurality of convolutional layers and pooling layers, etc. After multilayers feature extraction are completed, a low-level feature may be gradually converted into a middle-level feature or a high-level feature so as to improve the expression of the target image and facilitate subsequent processing.

At step 104, the feature map is segmented in a dimension corresponding to the height direction of the target image to obtain a preset number of segment features.

The preset number of segment features may be obtained by segmenting the feature map in the height direction of the target image, wherein each segment feature may be considered to correspond to one target object, and the preset number is equal to a maximum number of target objects to be identified.

In one example, the feature map may include a plurality of dimensions, for example, a channel dimension, a height dimension, a width dimension, a batch dimension, etc. The format of the feature map may be expressed as, for example, [B C H W], wherein B indicates the batch dimension, C indicates the channel dimension, H indicates the height dimension, and W indicates the width dimension. The direction indicated by the height dimension of the feature map may be determined based on the height direction of the target image, and the direction indicated by the width dimension of the feature map may be determined based on the width direction of the target image.

At step 105, the target objects are identified based on each of the preset number of segment features.

Because each segment feature corresponds to one target object, compared with performing object identification by directly using the feature map of the target image, identifying target objects by using each segment feature eliminates impact on the number of target objects, and improves the identification accuracy for the target objects in the target image.

In some embodiments, an image acquisition apparatus disposed on a side of the target region may photograph a target image involving a plurality of target objects that are in a stand mode (called a side view image), or an image acquisition apparatus disposed above the target region may photograph a target image involving a plurality of target objects that are in a float mode (called an overhead view image).

In some embodiments, the height of the target image may be adjusted by the following method.

A preset height and a preset width corresponding to the target image are first obtained and used for resizing the target image, wherein the preset width may be set according to an average width of the target objects, and the preset height may be set according to an average height of the target objects and a maximum number of the target objects to be identified.

In one example, the height and width of the target image may be scaled in equal proportions until the width of the target image reaches a preset width, wherein scaling in equal proportions refers to enlarging or reducing the target image in a case of maintaining the proportion of the height to the width of the target image unchanged. The unit of the preset width and of the preset height may be a pixel and may also be other units, which is not limited in the present disclosure.

In a case that the width of the scaled target image reaches the preset width while a height of the scaled target image is greater than the preset height, the height and width of the scaled target image are reduced by equal proportions until a height of the reduced target image is equal to the preset height.

For example, assuming that the target objects are game coins, the preset width may be set to 224 pix (pixel) according to an average width of the game coins, and the preset height may be set to 1344 pix based on an average height of the game coins and a maximum number of the game coins to be identified (for example, 72). First, the width of the target image may be scaled to 224 pix, and the height of the target image is scaled in equal proportions. In a case that the height of the scaled target image is greater than 1344 pix, the height of the scaled target image may be adjusted again to enable the height of the adjusted target image to be 1344 pix, and the width of the target image is adjusted in equal proportions, thereby implementing that the height of the target image is adjusted to a preset height of 1344 pix. In the case that the height of the adjusted target image is equal to 1344 pix, there is no need to adjust again, and adjusting the height of the target image to a preset height of 1344 pix is implemented.

In one example, the height and width of the target image are scaled in equal proportions until the width of the target image reaches the preset width. In a case that the width of the scaled target image reaches the preset width while the height of the scaled target image is less than the preset height, the scaled target image is filled with first pixels, so that the height of the filled target image is equal to the preset height.

The first pixel may be a pixel of which a pixel value is zero, i.e., a black pixel. The first pixel may also be set to other pixel values, and the specific pixel value does not affect the effect of the embodiments of the present disclosure.

Still taking the cases that the target objects are game coins, the preset width is 224 pix, the preset height is 1344 pix, and the maximum number is 72 as an example, the width of the target image may be first scaled to 224 pix, and the height of the target image is scaled in equal proportions. In a case that the height of the scaled target image is less than 1344 pix, a height less than 1344 pix and higher than the height of the scaled target image is filled with the black pixel so that the height of the filled target image is 1344 pix. In a case that the height of the filled target image is equal to 1344 pix, there is no need to fill, and adjusting the height of the target image to a preset height of 1344 pix is implemented.

After the height of the target image is adjusted to the preset height, the feature map of the adjusted target image may be segmented in a dimension corresponding to the height direction of the target image to obtain a preset number of segment features.

Taking the feature map [B C H W] as an example, the feature map [B C H W] is segmented in an H dimension (a height dimension) according to the preset number, i.e., the maximum number of the target objects to be identified, for example, 72. The scaled target image is filled in a case that the height of the scaled target image is less than the preset height, so that the height of the filled target image reaches the present height, and the height of the target image is adjusted to the preset height by reducing by equal proportions in a case that the height of the scaled target image is greater than the preset height, so that the feature map of the target image is obtained according to the target image with the preset height. Moreover, because the preset height is set according to the maximum number of the target objects to be identified, the feature map is segmented according to the maximum number, a preset number of segment features are obtained, each segment feature corresponds to each target object, and target objects are identified based on each segment feature. Therefore, the impact on the number of target objects can be reduced, and the identification accuracy for the target objects can be improved.

In some embodiments, for the filled target image, the preset number of segment features are obtained by segmenting the filled target image, when classifying the segment features, the segment feature corresponding to a region filled with the first pixel, a classification result of which is null. For example, for the segment features corresponding to a region filled with the black pixels, the classification results corresponding to the segment feature may be determined to be null. A number of non-null classification results may be determined by a difference between the maximum number of the target objects to be identified and the number of null classification results, or determined by directly identifying the segment features corresponding to the target objects. Thereby based on the number of obtained non-null classification results, the number of target objects included in the target image may be determined.

Assuming that the maximum number of target objects to be identified is 72, the feature map of the target image is segmented into 72 segments, the target objects are identified according each segment feature map, and 72 classification results may be obtained. In a case that the target image includes a black pixel filled region, the classification results corresponding to the segment feature maps of the filled region are null, for example, in a case that 16 null classification results are obtained, 56 non-null classification results are obtained, so that the target image may be determined to include 56 target objects.

The person skilled in the art should understand that the above preset width parameter, preset height parameter, and the maximum number parameter of target objects to be identified are examples, and the specific values of the parameters may be specifically set based on actual needs. No limitation is made thereto in the embodiments of the present disclosure.

In some embodiments, extracting the feature map and identifying the target objects both are performed by a neural network, and the neural network is trained from a sample image and labeled information thereof. The neural network may include a feature extraction network and a classification network, wherein the feature extraction network is used for extracting the feature map of a resized target image, and the classification network is used for identifying target objects based on each of a preset number of segment features. The sample image includes a plurality of target objects.

In one example, the labeled information of the sample image includes a labeled category of each target object in the sample image; and the neural network is trained by: extracting features from a resized sample image to obtain a feature map of the resized sample image; identifying target objects in the sample image based on each segment feature that is obtained by segmenting the feature map, to obtain a predicted category of each of the target objects in the sample image; and adjusting a value of a parameter for the neural network based on the predicted category of each target object in the sample image and the labeled category of each target object in the sample image.

Taking game coins as an example, the category of each game coin is related to the denomination, and game coins having the same denomination belong to the same category. For the sample image involving a plurality of game coins that are stacked in a stand mode, the denomination of each game coin is labeled in the sample image. The neural network for identifying target objects is trained based on the sample image in which the denomination is labeled. The denomination of each game coin is predicted by the neural network based on the sample image by using a difference between the predicted category and the labeled category, a value of a parameter for the neural network, for example, including a value of a parameter for the feature extraction network and a value of parameter for the classification network, is adjusted, and when the difference between the predicted category and the labeled category is less than a set threshold or iteration reaches a set number of times, the training is completed.

In one example, the labeled information of the sample image further includes the number of target objects of each labeled category; and in this case, the value of the parameter for the neural network is adjusted based on the predicted category of each target object in the sample image, the labeled category of each target object in the sample image, the number of target objects of each labeled category in the sample image, and the number of target objects of each predicted category in the sample image.

Still taking the plurality of game coins that are stacked in a stand mode as an example, the denomination information of each game coin and the number information of game coins of each denomination are annotated in the sample image. The neural network for identifying target objects is trained based on the sample image in which the above information is labeled. The denomination of each game coin and the number of game coins of the same denomination are predicted by the neural network based on the sample image. The value of the parameter for the neural network is adjusted based on the difference between the predicted result and the labeled information.

In one example, the labeled information of the sample image further includes the total number of target objects in the sample image; and in this case, the value of the parameter for the neural network is adjusted based on the predicted category of each target object in the sample image, the labeled category of each target object in the sample image, a sum of numbers of target objects of respective predicted category in the sample image, and the total number of target objects in the sample image.

Still taking the plurality of game coins that are stacked in a stand mode as an example, the denomination information of each game coin and the total number information of the game coins are annotated in the sample image. The neural network for identifying target objects is trained based on the sample image in which the above information is labeled. The denomination of each game coin and the total number of the game coins (i.e. the predicted results) are predicted by the neural network based on the sample image. The value of the parameter for the neural network is adjusted based on the difference between the predicted result and the labeled information.

In one example, the labeled information of the sample image includes the labeled category of each target object in the sample image, the number of target objects of each labeled category in the sample image, and the total number of target objects in the sample image; and in this case, the value of the parameter for the neural network is adjusted based on the predicted category of each target object in the sample image, the labeled category of each target object in the sample image, the number of target objects of each labeled category in the sample image and the number of target objects of each predicted category in the sample image, a sum of numbers of target objects of respective predicted category in the sample image, and the total number of target objects in the sample image.

Still taking the plurality of game coins that are stacked in a stand mode as an example, the denomination information of each game coin, the number information of each denomination of game coins, and the total number information of the game coins are labeled in the sample image. The neural network for identifying target objects is trained based on the sample image in which the above information is labeled. The denomination of each game coin, the number of game coins of each denomination, and the total number of the game coins are predicted by the neural network based on the sample image. The value of the parameter for the neural network is adjusted based on the difference between the predicted result and the labeled information.

In the embodiments of the present disclosure, the loss function used for training the neural network includes at least one of the following: a cross-entropy loss, a number loss of each category of target objects, or a total number loss of the target objects. That is, in addition to the cross-entropy loss, the loss function may also include the number loss of each category of target objects, and the total number loss of the target objects, thereby improving the ability to identify the number of target objects.

In some embodiments, when training the neural network, training data may be augmented, so that the neural network for identifying the category and number of the target objects provided by the embodiments of the present disclosure may be applied to an actual scene better. For example, data augmentation may be performed by using any one or more of the following: flipping the sample image horizontally, rotating the sample image at a set angle, performing color transformation on the sample image, performing brightness transformation on the sample image, and the like.

The method for identifying target objects provided by multiple embodiments of the present disclosure may be used for identifying a plurality of categories of target objects, and identifying the target objects by using the segmented feature maps, and with the increase of categories, the identification precision of each category of target objects does not decrease due to the increase of category types.

In some embodiments, the trained neural network may also be tested; an identification accuracy for each category of target objects identified by the neural network is ranked based on a result of the testing, to obtain an identification accuracy rank result; an identification error rate for each category of target objects identified by the neural network is ranked based on result of the testing, to obtain an identification error rate rank result; and the neural network is further trained based on the identification accuracy rank result and the identification error rate rank result.

The identification accuracy rank result and the identification error rate rank result of respective categories of target objects may be stored by using a two-dimensional table. For example, the identification accuracy rank result are stored in the table in order from top to bottom, the identification error rate rank result are stored in the table in order from left to right, and for categories within a set range in the table, for example, the categories within the third row and first three columns in the table, the training is continued so as to improve the identification precision and accuracy of the neural network for these categories.

Figure 3:
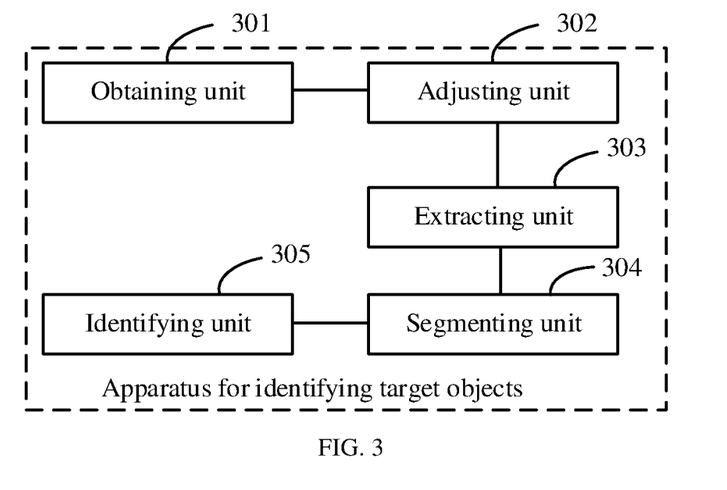
FIG. 3 is a schematic block diagram of an apparatus for identifying target objects according to at least one embodiment of the present disclosure.

FIG. 3 is a schematic block diagram of an apparatus for identifying target objects according to at least one embodiment of the present disclosure. As shown in FIG. 3, the apparatus includes: an obtaining unit 301 configured to clip out a target image from an acquired image, wherein the target image involves a plurality of target objects to be identified that are stacked; an adjusting unit 302 configured to adjust a height of the target image to a preset height, wherein a height direction of the target image corresponds to a direction in which the plurality of target objects to be identified are stacked; an extracting unit 303 configured to extract a feature map of the adjusted target image; a segmenting unit 304 configured to segment the feature map in a dimension corresponding to the height direction of the target image to obtain a preset number of segment features; and an identifying unit 305 configured to identify the target objects based on each of the preset number of segment features.

In some embodiments, the adjusting unit 302 is configured to: scale the height and a width of the target image in equal proportions until a width of the scaled target image reaches a preset width; and in a case that the width of the scaled target image reaches the preset width while a height of the scaled target image is greater than the preset height, reduce the height and width of the scaled target image by equal proportions until a height of the reduced target image is equal to the preset height.

In some embodiments, the adjusting unit 302 is configured to: scale the height and a width of the target image in equal proportions until a width of the scaled target image reaches a preset width; and in a case that the width of the scaled target image reaches the preset width while a height of the scaled target image is less than the preset height, fill the scaled target image with first pixels, so that a height of the filled target image is equal to the preset height.

In some embodiments, each of the target objects to be identified in the target image is sheet-like and has an equal thickness, and the plurality of target objects to be identified are stacked in a direction of the thickness; and the preset height is an integer multiple of the thickness.

In some embodiments, extracting the feature map and identifying the target objects both are performed by a neural network which is trained from a sample image and labeled information thereof.

In some embodiments, the labeled information of the sample image includes a labeled category of each target object in the sample image; and the apparatus further includes a training unit configured to train the neural network by: extracting feature from a resized sample image to obtain a feature map of the resized sample image; identifying target objects in the sample image based on each segment feature that is obtained by segmenting the feature map, to obtain a predicted category of each of the target objects in the sample image; and adjusting a value of a parameter for the neural network based on the predicted category of each target object in the sample image and the labeled category of each target object in the sample image.

In some embodiments, the labeled information of the sample image further includes a number of target objects of each labeled category; and when adjusting the value of the parameter for the neural network based on the predicted category of each target object in the sample image and the labeled category of each target object in the sample image, the training unit is configured to: adjust the value of the parameter for the neural network based on the predicted category of each target object in the sample image, the labeled category of each target object in the sample image, the number of target objects of each labeled category in the sample image, and a number of target objects of each predicted category in the sample image.

In some embodiments, the labeled information of the sample image further includes a total number of target objects in the sample image; and when adjusting the value of the parameter for the neural network based on the predicted category of each target object in the sample image and the labeled category of each target object in the sample image, the training unit is configured to: adjust the value of the parameter for the neural network based on the predicted category of each target object in the sample image, the labeled category of each target object in the sample image, a sum of numbers of target objects of respective predicted category in the sample image, and the total number of target objects in the sample image.

In some embodiments, the apparatus further includes a testing unit configured to: test the trained neural network; rank an identification accuracy for each category of target objects identified by the neural network based on a result of the testing, to obtain an identification accuracy rank result; rank an identification error rate for each category of target objects identified by the neural network based on the result of the testing, to obtain an identification error rate rank result; and further training the neural network based on the identification accuracy rank result and the identification error rate rank result.

Figure 4:
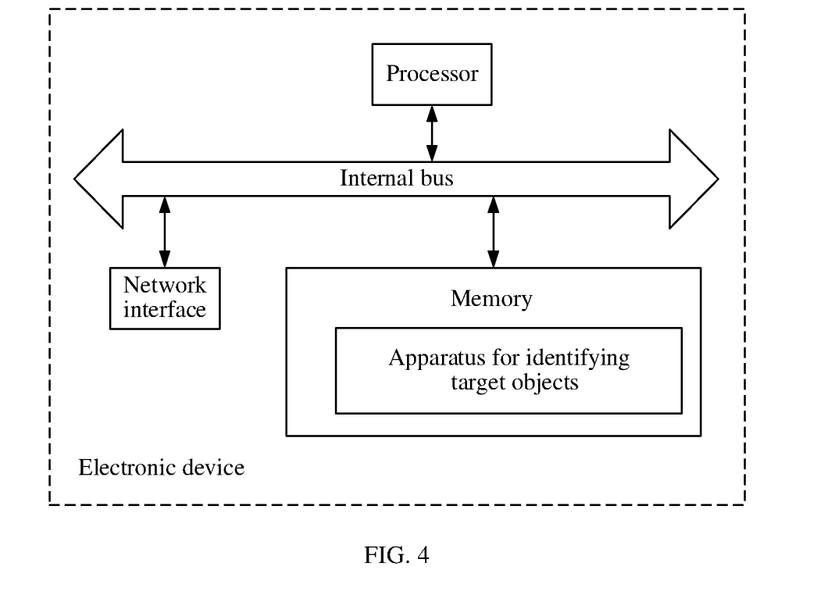
FIG. 4 is a schematic block diagram of an electronic device according to at least one embodiment of the present disclosure.

FIG. 4 is a schematic block diagram of an electronic device according to at least one embodiment of the present disclosure. As shown in FIG. 4, the electronic device may include a processor and a memory storing computer readable instructions executable by the processor, wherein the processor is configured to execute the computer readable instructions to implement the method for identifying target objects according to any of the implementations of the present disclosure.

At least one embodiment of the present disclosure may further provide a computer readable storage medium having computer program instructions stored thereon. When executed by a processor, the computer program instructions may cause the processor to implement the method for identifying target objects according to any of the implementations of the present disclosure.

A person skilled in the art should understand that one or more embodiments of the present disclosure may be provided as a method, a system, or a computer program product. Therefore, one or more embodiments of the present disclosure may be in the forms of full hardware embodiments, full software embodiments, or embodiments in combination with software and hardware. Moreover, one or more embodiments of the present disclosure may be in the form of a computer program product implemented on one or more computer usable storage media (including but not limited to a disk memory, a CD-ROM, an optical memory, etc.) having computer usable program codes stored therein.

"And/or" in the present disclosure indicates at least one of the two, for example, "A and/or B" includes three solutions: A, B, and "A and B".

The embodiments in the present disclosure are described in a progressive manner, for same or similar parts between the various embodiments may be referred to each other, and each embodiment focuses on the difference from other embodiments. In particular, data processing device embodiments are substantially similar to method embodiments and therefore are only described briefly, and for the relevant parts may be referred to the descriptions of the method embodiments.

The foregoing describes specific embodiments of the present disclosure. There may be other embodiments within the scope of the appended claims. In some cases, actions or steps recited in the claims may be performed in a different order than the embodiments and may still achieve a desired result. In addition, the processes depicted in the accompanying drawings are not necessarily in a particular order or in a sequential order to achieve the desired result. In some implementations, multi-task processing and parallel processing are possible or may be advantageous.

Embodiments of the subject matter and functional operations described in the specification may be implemented in the following: digital electronic circuitry, tangible embodied computer software or firmware, computer hardware including the structures disclosed in the specification and structural equivalents thereof, or a combination of one or more thereof. Embodiments of the subject matter described in the specification may be implemented as one or more computer programs, that is, one or more modules of computer program instructions encoded on a tangible non-transitory program carrier to be executed by a data processing apparatus or to control operations of the data processing apparatus. Alternatively or additionally, the program instructions may be encoded on manually generated propagated signals, such as a machine-generated electrical, optical or electromagnetic signal, which is generated to encode and transmit information to a suitable receiver apparatus to be executed by the data processing apparatus. The computer storage medium may be a machine-readable storage device, a machine-readable storage substrate, a random or serial access memory device, or a combination of one or more thereof.

The processes and logic flows described in the specification may be performed by one or more programmable computers executing one or more computer programs to perform corresponding functions by operating on input data and generating an output. The processes and logic flows may also be performed by a special logic circuit, such as a Field Programmable Gate Array (FPGA) or an Application Specific Integrated Circuit (ASIC), and the apparatus may also be implemented as a special logic circuit.

Computers suitable for executing a computer program include, for example, a general-purpose microprocessor and/or a special-purpose microprocessor, or any other type of central processing unit. Generally, the central processing unit receives instructions and data from a read-only memory (ROM) and/or a random access memory (RAM). Basic components of a computer include a central processing unit for implementing or executing instructions and one or more memory devices for storing instructions and data. Generally, the computer further includes one or more mass storage devices for storing data, such as a magnetic disk, a magneto-optical disk, or an optical disk, etc., or the computer is operatively coupled to the mass storage device to receive data from the mass storage device or transmit data to the mass storage device, or both. However, the computer does not necessarily have such a device. Moreover, the computer may be embedded in another device, such as a mobile phone, a Personal Digital Assistant (PDA), a mobile audio or a video player, a game console, a Global Positioning System (GPS) receiver, or a portable storage device, for example, a Universal Serial Bus (USB) flash drive, to name a few.

A computer-readable medium suitable for storing computer program instructions and data includes all forms of a non-volatile memory, a medium, and a memory device, including, for example, a semiconductor memory device (such as an EPROM, an EEPROM, and flash device), a magnetic disk (such as an internal hard disk or a movable disk), a magneto-optical disk, and a CD ROM and DVD-ROM disk. The processor and the memory may be supplemented by, or incorporated in, a special logic circuit.

Although the present disclosure includes many specific implementation details, these details should not be interpreted as limiting the present disclosure, but rather are mainly used to describe the features of specific embodiments of the present disclosure. Some features that are described in multiple embodiments in the present disclosure may also be implemented in combination in a single embodiment. On the other hand, various features described in a single embodiment may be separately implemented in multiple embodiments or in any suitable sub-combination. Moreover, although the features may function in some combinations as described above and even initially claimed, one or more features from a claimed combination may be removed from the combination in some cases, and the claimed combination may point to a sub-combination or a variant of the sub-combination.

Similarly, although operations are depicted in the accompanying drawings in a particular order, this should not be construed as requiring these operations to be performed in the particular order shown or sequentially, or that all illustrated operations be performed to achieve a desired result. In some cases, multi-task and parallel processing may be advantageous. Moreover, the separation of various system modules and components in the foregoing embodiments should not be understood as requiring such separation in all embodiments, and it should be understood that the described program components and systems may generally be integrated together in a single software product or packaged into multiple software products.

Therefore, particular embodiments of the subject matter have been described. Other embodiments are within the scope of the appended claims. In some cases, the actions recited in the claims may be performed in a different order and still achieve a desired result. Moreover, the processes depicted in the accompanying drawings are not necessarily required to be in the particular order or sequentially shown to achieve a desired result. In certain implementations, multi-task and parallel processing may be advantageous.

Some embodiments of the present disclosure are described above, and shall not be interpreted as limitation to the present disclosure. Any modifications, alteration or equivalent substitutions which may be made based on the spirit and principle of the present disclosure should fall within the scope of the present disclosure.

The invention claimed is:

1. A method for identifying target objects, comprising:
   clipping out a target image from an acquired image, wherein the target image involves a plurality of target objects to be identified that are stacked;
   adjusting a height of the target image to a preset height, wherein a height direction of the target image corresponds to a direction in which the plurality of target objects to be identified are stacked;
   extracting a feature map of the adjusted target image;
   segmenting the feature map in a dimension corresponding to the height direction of the target image to obtain a preset number of segment features; and
   identifying the target objects based on each of the preset number of segment features.

2. The method according to claim 1, wherein adjusting the height of the target image to the preset height comprises:
   scaling the height and a width of the target image in equal proportions until a width of the scaled target image reaches a preset width; and
   in a case that a height of the scaled target image is greater than the preset height, reducing the height and width of the scaled target image by equal proportions until a height of the reduced target image is equal to the preset height.

3. The method according to claim 1, wherein adjusting the height of the target image to the preset height comprises:
   scaling the height and a width of the target image in equal proportions until a width of the scaled target image reaches a preset width; and
   in a case that a height of the scaled target image is less than the preset height, filling the scaled target image with first pixels, so that a height of the filled target image is equal to the preset height.

4. The method according to claim 1, wherein
   each of the target objects to be identified in the target image is sheet-like and has an equal thickness, and the plurality of target objects to be identified are stacked in a direction of the thickness; and
   the preset height is an integer multiple of the thickness.

5. The method according to claim 1, wherein extracting the feature map and identifying the target objects both are performed by a neural network which is trained from a sample image and labeled information thereof.

6. The method according to claim 5, wherein
   the labeled information of the sample image comprises a labeled category of each target object in the sample image; and
   the neural network is trained by:
      extracting features from a resized sample image to obtain a feature map of the resized sample image;
      identifying target objects in the sample image based on each segment feature that is obtained by segmenting the feature map, to obtain a predicted category of each of the target objects in the sample image; and
      adjusting a value of a parameter for the neural network based on the predicted category of each target object in the sample image and the labeled category of each target object in the sample image.

7. The method according to claim 6, wherein
   the labeled information of the sample image further comprises a number of target objects of each labeled category; and
   adjusting the value of the parameter for the neural network comprises:
      adjusting the value of the parameter for the neural network based on the predicted category of each target object in the sample image, the labeled category of each target object in the sample image, the number of target objects of each labeled category in the sample image, and a number of target objects of each predicted category in the sample image.

8. The method according to claim 6, wherein
   the labeled information of the sample image further comprises a total number of target objects in the sample image; and
   adjusting the value of the parameter for the neural network comprises:
      adjusting the value of the parameter for the neural network based on the predicted category of each target object in the sample image, the labeled category of each target object in the sample image, a sum of numbers of target objects of respective predicted categories in the sample image, and the total number of target objects in the sample image.

9. The method according to claim 5, further comprising:
   testing the trained neural network;
   ranking an identification accuracy for each category of target objects identified by the neural network based on a result of the testing, to obtain an identification accuracy rank result;
   ranking an identification error rate for each category of target objects identified by the neural network based on the result of the testing, to obtain an identification error rate rank result; and
   further training the neural network based on the identification accuracy rank result and the identification error rate rank result.

10. An electronic device, comprising:
    a processor; and
    a memory storing computer readable instructions executable by the processor;
    wherein the processor is configured to execute the computer readable instructions to implement operations comprising:
    clipping out a target image from an acquired image, wherein the target image involves a plurality of target objects to be identified that are stacked;
    adjusting a height of the target image to a preset height, wherein a height direction of the target image corresponds to a direction in which the plurality of target objects to be identified are stacked;
    extracting a feature map of the adjusted target image;
    segmenting the feature map in a dimension corresponding to the height direction of the target image to obtain a preset number of segment features; and
    identifying the target objects based on each of the preset number of segment features.

11. The device according to claim 10, wherein adjusting the height of the target image to the preset height comprises:
    scaling the height and a width of the target image in equal proportions until a width of the scaled target image reaches a preset width; and
    in a case that a height of the scaled target image is greater than the preset height, reducing the height and width of the scaled target image by equal proportions until a height of the reduced target image is equal to the preset height.

12. The device according to claim 10, wherein adjusting the height of the target image to the preset height comprises:
scaling the height and a width of the target image in equal proportions until a width of the scaled target image reaches a preset width; and
in a case that a height of the scaled target image is less than the preset height, filling the scaled target image with first pixels, so that a height of the filled target image is equal to the preset height.

13. The device according to claim 10, wherein
each of the target objects to be identified in the target image is sheet-like and has an equal thickness, and the plurality of target objects to be identified are stacked in a direction of the thickness; and
the preset height is an integer multiple of the thickness.

14. The device according to claim 10, wherein extracting the feature map and identifying the target objects both are performed by a neural network which is trained from a sample image and labeled information thereof.

15. The device according to claim 14, wherein
the labeled information of the sample image comprises a labeled category of each target object in the sample image; and
the neural network is trained by:
extracting features from a resized sample image to obtain a feature map of the resized sample image;
identifying target objects in the sample image based on each segment feature that is obtained by segmenting the feature map, to obtain a predicted category of each of the target objects in the sample image; and
adjusting a value of a parameter for the neural network based on the predicted category of each target object in the sample image and the labeled category of each target object in the sample image.

16. The device according to claim 15, wherein
the labeled information of the sample image further comprises a number of target objects of each labeled category; and
adjusting the value of the parameter for the neural network comprises:
adjusting the value of the parameter for the neural network based on the predicted category of each target object in the sample image, the labeled category of each target object in the sample image, the number of target objects of each labeled category in the sample image, and a number of target objects of each predicted category in the sample image.

17. The device according to claim 15, wherein
the labeled information of the sample image further comprises a total number of target objects in the sample image; and
adjusting the value of the parameter for the neural network comprises:
adjusting the value of the parameter for the neural network based on the predicted category of each target object in the sample image, the labeled category of each target object in the sample image, a sum of numbers of target objects of respective predicted categories in the sample image, and the total number of target objects in the sample image.

18. The device according to claim 14, wherein the operations further comprising:
testing the trained neural network;
ranking an identification accuracy for each category of target objects identified by the neural network based on a result of the testing, to obtain an identification accuracy rank result;
ranking an identification error rate for each category of target objects identified by the neural network based on the result of the testing, to obtain an identification error rate rank result; and
further training the neural network based on the identification accuracy rank result and the identification error rate rank result.

19. A non-transitory computer-readable storage medium having computer program instructions stored thereon, wherein the computer program instructions, when executed by a processor, cause the processor to implement operations comprising:
clipping out a target image from an acquired image, wherein the target image involves a plurality of target objects to be identified that are stacked;
adjusting a height of the target image to a preset height, wherein a height direction of the target image corresponds to a direction in which the plurality of target objects to be identified are stacked;
extracting a feature map of the adjusted target image;
segmenting the feature map in a dimension corresponding to the height direction of the target image to obtain a preset number of segment features; and
identifying the target objects based on each of the preset number of segment features.

20. The non-transitory computer-readable storage medium according to claim 19, wherein adjusting the height of the target image to the preset height comprises:
scaling the height and a width of the target image in equal proportions until a width of the scaled target image reaches a preset width;
in a case that a height of the scaled target image is greater than the preset height, reducing the height and width of the scaled target image by equal proportions until a height of the reduced target image is equal to the preset height; and
in a case that a height of the scaled target image is less than the preset height, filling the scaled target image with first pixels, so that a height of the filled target image is equal to the preset height.

* * * * *